United States Patent
Lin et al.

(10) Patent No.: US 7,753,325 B2
(45) Date of Patent: Jul. 13, 2010

(54) MOUNTING APPARATUS FOR DATA STORAGE DEVICES

(75) Inventors: Yu-Bo Lin, Shenzhen (CN); Chun-Chi Liang, Tu-Cheng (TW); Guang-Yao Lee, Tu-Cheng (TW); Hsuan-Tsung Chen, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 857 days.

(21) Appl. No.: 11/309,545

(22) Filed: Aug. 18, 2006

(65) Prior Publication Data

US 2007/0145214 A1 Jun. 28, 2007

(30) Foreign Application Priority Data

Dec. 23, 2005 (TW) .................................. 94222569

(51) Int. Cl.
*G06F 1/16* (2006.01)

(52) U.S. Cl. ............................. 248/222.11; 248/225.11; 361/703

(58) Field of Classification Search ................. 248/505, 248/510, 222.11, 225.11; 361/687, 694–697, 361/703, 704, 679, 684, 685
See application file for complete search history.

(56) References Cited

U.S. PATENT DOCUMENTS

| | | | |
|---|---|---|---|
| 6,614,654 B2 | 9/2003 | Liu et al. | |
| 6,667,880 B2 | 12/2003 | Liu et al. | |
| 6,798,653 B2 | 9/2004 | Chen et al. | |
| 6,813,148 B2 | 11/2004 | Hsu et al. | |
| 7,035,099 B2 | 4/2006 | Wu | |
| 7,036,783 B2 | 5/2006 | Chen et al. | |
| 7,050,298 B2 | 5/2006 | Chen | |
| 7,327,565 B2 * | 2/2008 | Chen et al. | 361/679.33 |
| 7,330,348 B2 * | 2/2008 | Chen et al. | 361/679.33 |
| 7,450,376 B2 * | 11/2008 | Chen et al. | 361/679.33 |
| 7,483,267 B2 * | 1/2009 | Chen et al. | 361/679.31 |
| 7,492,585 B2 * | 2/2009 | Zhang et al. | 312/334.7 |
| 2005/0047078 A1 | 3/2005 | Wu | |
| 2005/0094369 A1 | 5/2005 | Chen et al. | |
| 2005/0195564 A1 * | 9/2005 | Peng et al. | 361/685 |
| 2006/0164803 A1 * | 7/2006 | Chen et al. | 361/685 |

* cited by examiner

*Primary Examiner*—J. Allen Shriver, II
*Assistant Examiner*—Steven M Marsh
(74) *Attorney, Agent, or Firm*—Wei Te Chung

(57) ABSTRACT

A mounting apparatus for mounting a data storage device that has a protrusion protruding from a sidewall thereof includes a bracket for holding the data storage device, a mounting member, a locking member, and a resilient member. The bracket includes a first side wall. The first side wall defines a slideway, for receiving the protrusion of the data storage device to slide therealong. The mounting member is mounted to the first side wall. The locking member slidably mounted to the mounting member includes a projecting part adjacent the slideway of the bracket, for locating the protrusion of the data storage device. The resilient member is located between the mounting member and the locking member.

18 Claims, 6 Drawing Sheets

MOUNTING APPARATUS FOR DATA STORAGE DEVICES

FIELD OF THE INVENTION

The present invention relates to mounting apparatuses, and particularly to a mounting apparatus readily allowing installation or removal of data storage devices thereto or therefrom.

DESCRIPTION OF RELATED ART

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. Examples are disclosed in Taiwan Patent Application Nos. 82202124, 81207129, and 82207667. Fixing a data storage device to a drive bracket with bolts is unduly laborious and time-consuming. Furthermore, the computer enclosure needs extra operating space for carrying out repairs. Repairing a data storage device in a drive bracket with rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance, because plastic rails may easily wear out and require replacement.

What is desired, therefore, is a mounting apparatus which readily allows installation or removal of data storage devices thereto or therefrom.

SUMMARY OF THE INVENTION

An exemplary mounting apparatus for mounting a data storage device that has a protrusion protruding from a sidewall thereof includes a bracket for holding the data storage device, a mounting member, a locking member, and a resilient member. The bracket includes a first side wall. The first side wall defines a slideway, for receiving the protrusion of the data storage device to slide therealong. The mounting member is mounted to the first side wall. The locking member slidably mounted to the mounting member includes a projecting part adjacent the slideway of the bracket, for locating the protrusion of the data storage device. The resilient member is located between the mounting member and the locking member.

Other advantages and novel features will become more apparent from the following detailed description when taken in conjunction with the accompanying drawings, in which:

DETAILED DESCRIPTION OF THE INVENTION

Figure 1:
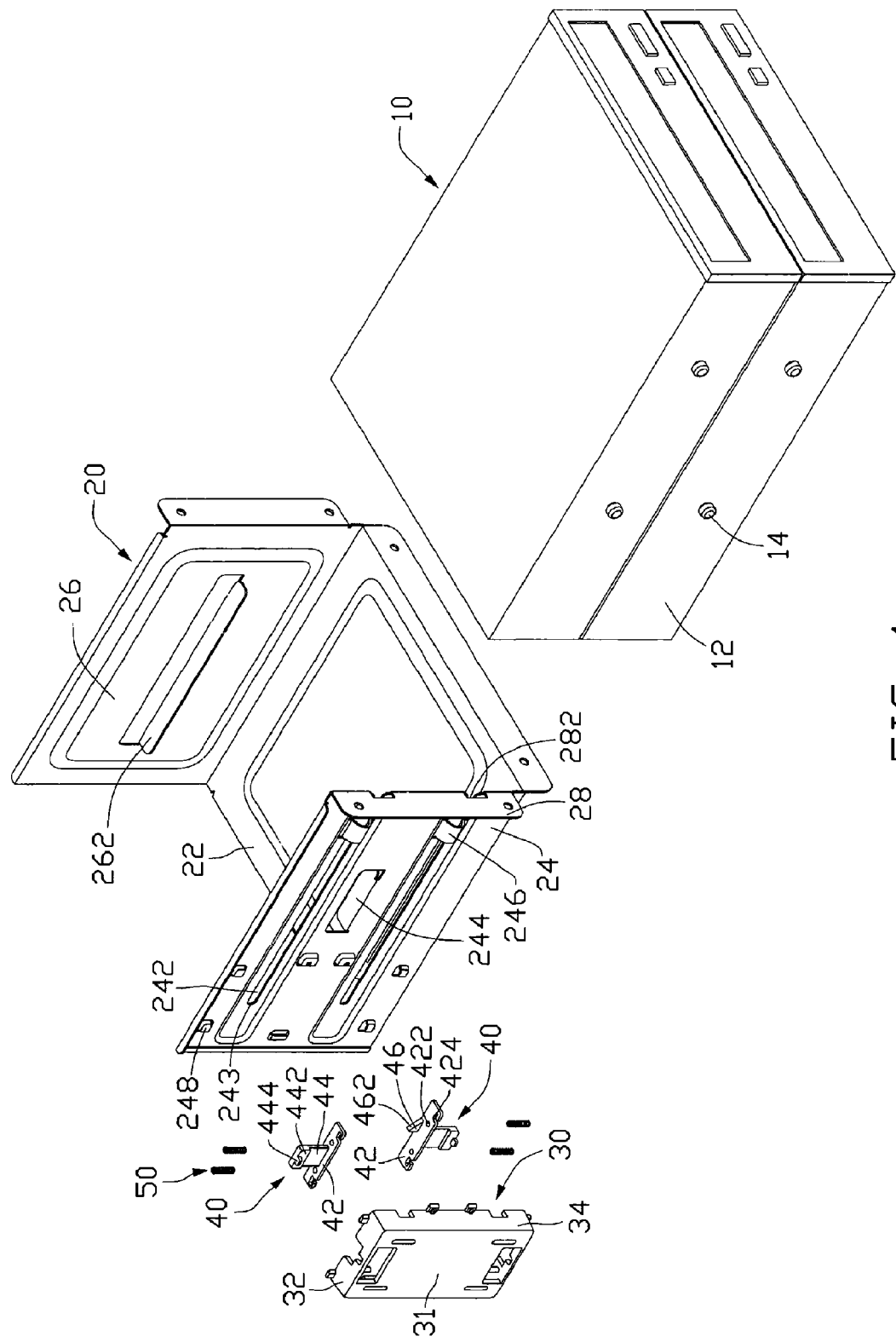
FIG. 1 is an exploded, isometric view of a mounting apparatus for data storage devices in accordance with a preferred embodiment of the present invention, together with two data storage devices, the mounting apparatus includes a bracket, and a securing assembly.

Referring to FIG. 1, a mounting apparatus in accordance with a preferred embodiment of the present invention is shown for mounting two data storage devices 10 to a computer enclosure. Each data storage device 10 includes two protrusions 14 protruding out from a sidewall 12 thereof. The mounting apparatus includes a bracket 20 mounted to the computer enclosure, and a securing assembly.

The bracket 20 includes a bottom wall 22, a first side wall 24 extending up from a side of the bottom wall 22, and a second side wall 26 extending up from an opposite side of the bottom wall 22. The bracket 20 includes an inlet for the data storage devices 10 passing therethrough. A flange 28 is perpendicularly bent out from an end of the first side wall 24 at the inlet. The first side wall 24 defines two slideways 242 parallel to the bottom wall 22. Two arch-shaped reinforcing ribs 246 are formed on the first side wall 24 spanning the slideways 242 respectively. On the first side wall 24 a first supporting board 244 is perpendicularly bent in from between the two slideways 242. A plurality of catches 248 each defining a receiving space is stamped out from the first side wall 24. Two cutouts 282 are defined in the flange 28 communicating with the corresponding slideways 242. Each slideway 242 has a blocking end 243 opposite to a corresponding cutout 282. A second supporting board 262 opposite to the first supporting board 244 of the first side wall 24 is perpendicularly bent in from the second side wall 26.

Figure 2:
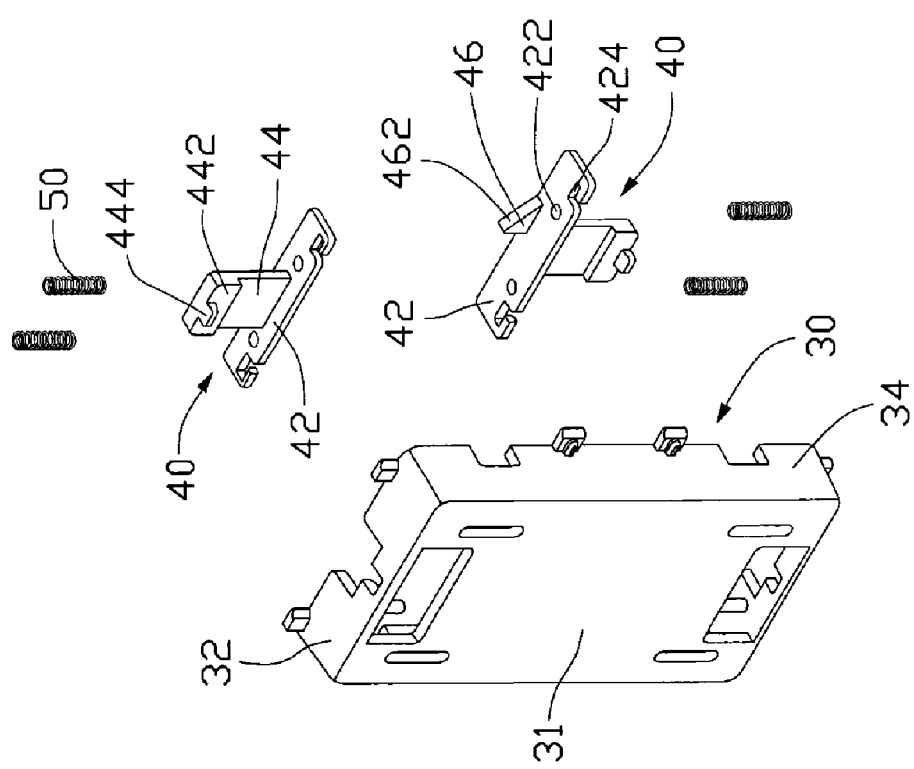
FIG. 2 is an enlarged view of the securing assembly of FIG. 1, the securing assembly includes a mounting member, two locking members, and two pairs of resilient members.
Figure 3:
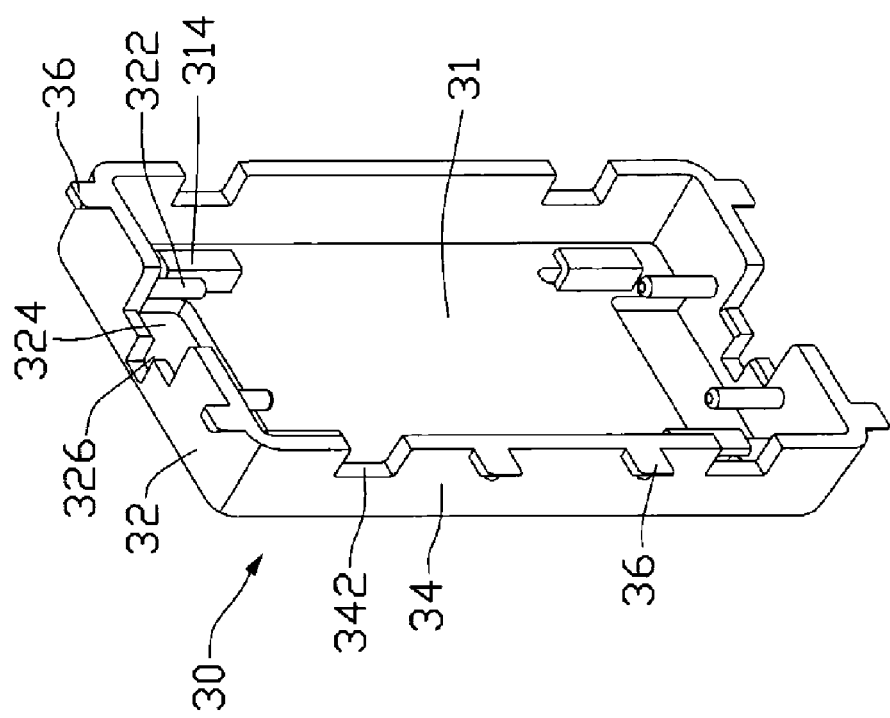
FIG. 3 is an isometric view of the mounting member of FIG. 2, but viewed from another aspect.

Referring also to FIGS. 2 and 3, the securing assembly includes a mounting member 30, two locking members 40, and two pairs of resilient members 50. The mounting member 30 includes a body 31 parallel to the first side wall 24 of the bracket 20, two end boards 32 extending toward the first side wall 24 of the bracket 20 from top and bottom ends of the body 31 respectively, and two side boards 34 extending toward the first side wall 24 of the bracket 20 from opposite sides of the body 31 respectively. A plurality of orientating members 36 extends out from distal edges of the end boards 32 and the side boards 34, for engaging with the corresponding catches 248 of the first side wall 24. Two cutouts 342 are defined in the distal edge of each side board 34. A pair of L-shaped guiding tabs 314 extends in from the body 31 adjacent each end board 32. A pair of shafts 322 extends from each end board 32 toward the opposite end board 32. A sliding slot 324 is defined in each end board 32. An avoiding slot 326 is defined in each end board 32 adjacent the body 31 and communicating with the sliding slot 324.

Each locking member 40 includes a main part 42, and an extension part 44 perpendicularly extending from the main part 42, and a projecting part 46 protruding opposite to the extension part 44 from the main part 42. A pair of through-holes 422 is defined in the main part 42 at opposite sides of the extension part 44. A pair of L-shaped guiding slots 424 is defined in opposite sides of the main part 42. A limiting portion 442 protrudes away from the first side wall 24 from a side of the extension part 44 adjacent a distal end of the extension part 44. An operating portion 444 extends away from the first side wall 24 from the distal end of the extension part 44. The projecting part 46 has a triangle shape and includes a slanting guiding surface 462 at a side thereof.

Figure 4:
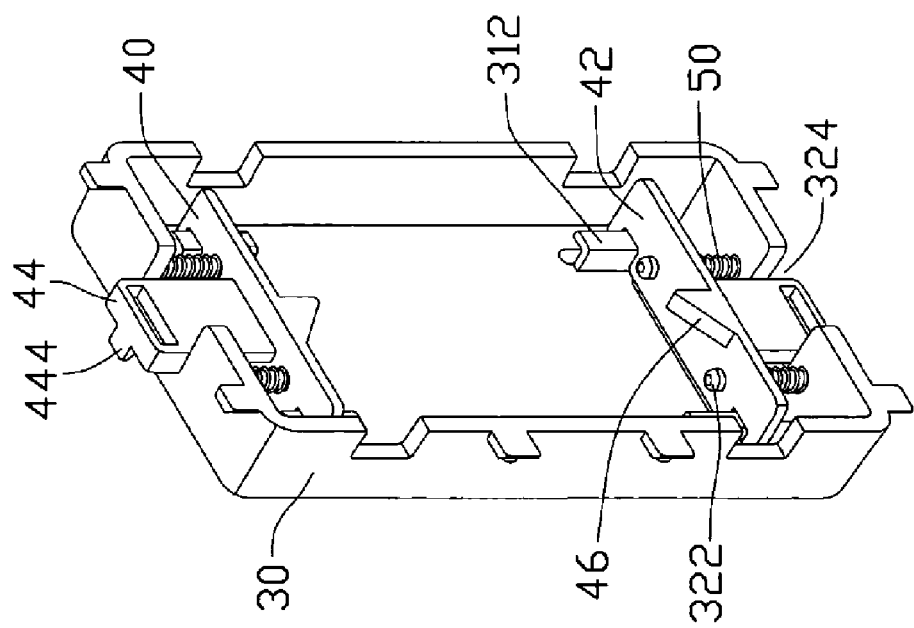
FIG. 4 is an assembled view of the securing assembly of FIG. 2, but viewed from another aspect.

Referring also to FIG. 4, in assembling the securing assembly, the resilient members 50 are fit about the corresponding shafts 322 of the mounting member 30. Guiding slots 424 of each locking member 40 are slidably received by the corresponding pair of guiding tabs 314. The locking member 40 is moved toward the corresponding end board 32. An upper portion of the extension part 44 is pushed away from the main part 31 of the mounting member 30 to allow the limiting portion 442 to pass through the sliding slot 324 of the corresponding end board 32 while the operating portion 444 passes through the avoiding slot 326 of the corresponding end board 32. While continuing to keep the extension part 44 pushed back, distal ends of the pair of shafts 322 of each end board 32 are slidably engaged in the corresponding through-holes 422 of the corresponding locking member 40. Then the extension part 44 is allowed to rebound. The limiting portion 442 of each locking member 40 is now extended out of the mounting member 30. Each end board 32 prevents the limiting portion 442 of the corresponding locking member 40 from sliding into the mounting member 30. Each pair of resilient members 50 is located between a corresponding end board 32, and the corresponding main part 42 of a corresponding locking member 40.

Figure 5:
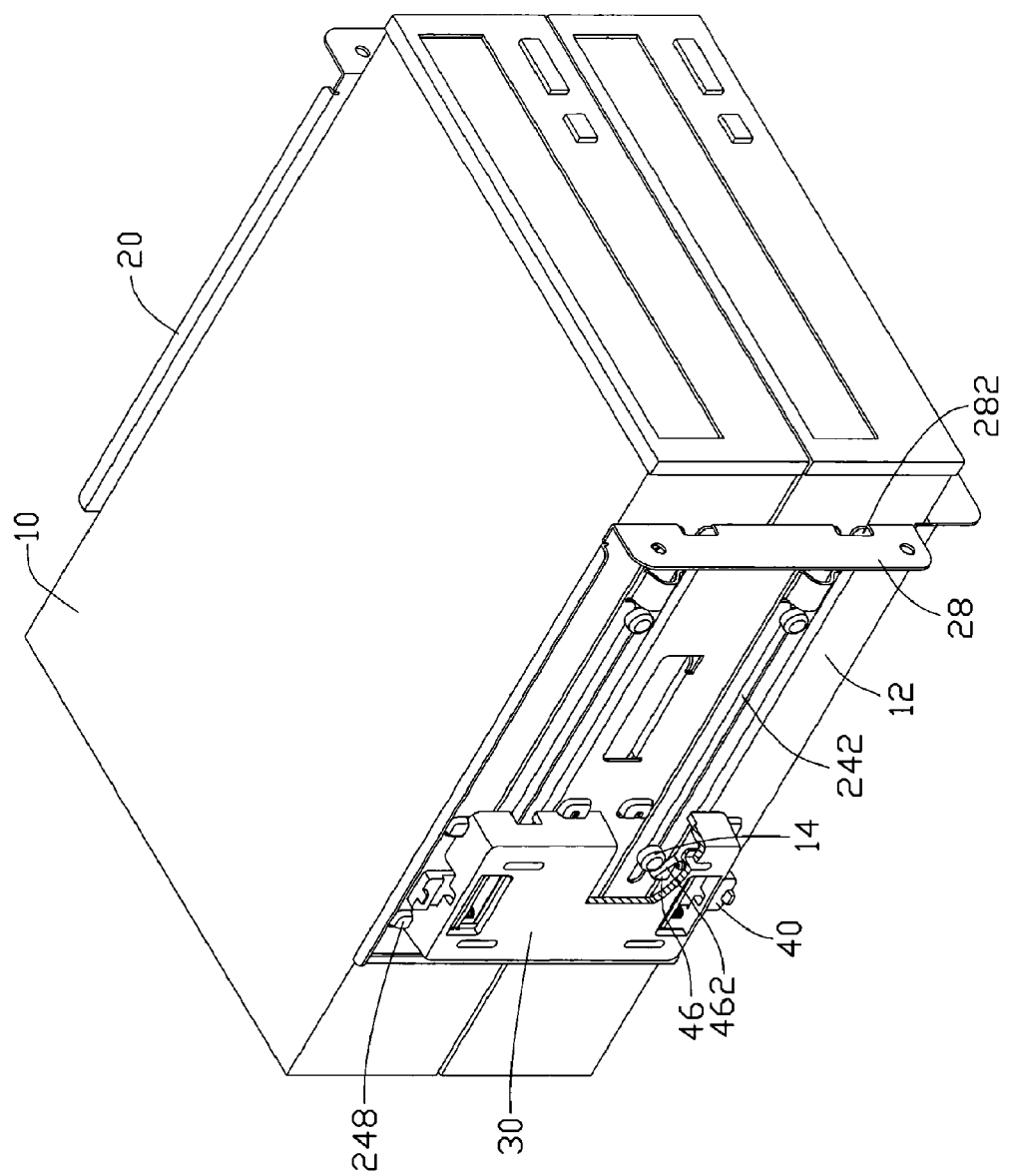
FIG. 5 is an assembled view of FIG. 1, but partially cut away, and showing the locking members in unlocked positions.
Figure 6:
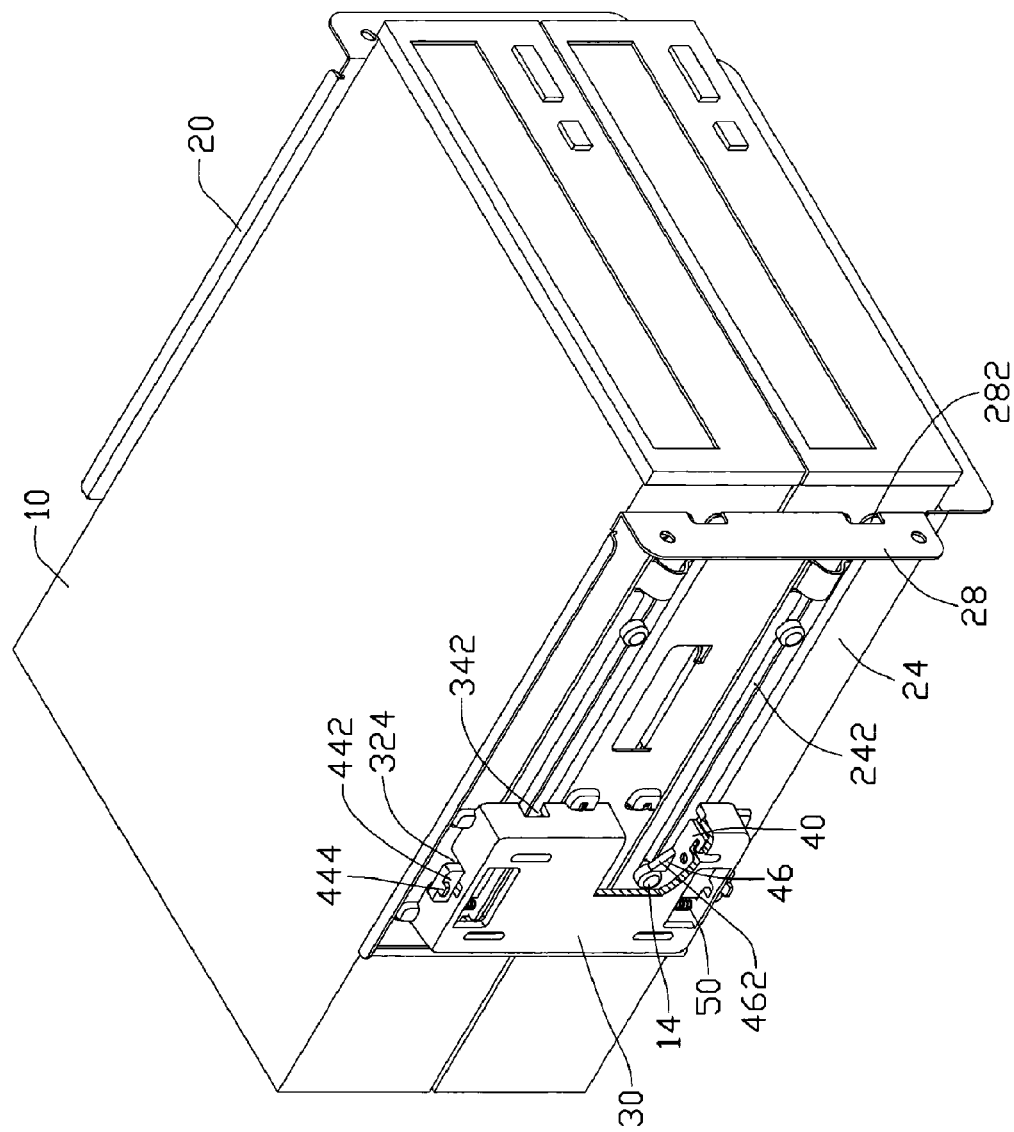
FIG. 6 is similar to FIG. 5, showing the locking members in locked positions.

Referring also to FIGS. 5 and 6, in assembling the securing assembly to the first side wall 24 of the bracket 20, the orientating members 36 of the mounting member 30 are engaged in the receiving spaces of the corresponding catches 248 of the first side wall 24. Thus, the securing assembly is mounted to the first side wall 24 of the bracket 20. The projecting part 46 of each locking member 40 is located adjacent the blocking end 243 of a corresponding slideway 242, with the guiding surface 462 thereof facing a corresponding cutout 282.

In mounting, one data storage device 10 is received by the first and second supporting plates 244, 262, and the other data storage device 10 is received by the bottom wall 22 of the bracket 20 from the inlet of the bracket 20. The protrusions 14 of the data storage devices 10 pass in turn through the corresponding cutouts 282 of the first side wall 24 to engage in the corresponding slideways 242 as the data storage devices 10 are pushed in. When one of the protrusions 14 of each data storage device 10 is pushed along the guiding surface 462 of the projecting part 46, the locking member 40 is urged to first extend from the mounting member 30 until the one of the protrusions 14 passes when it then rebounds, meanwhile, the resilient members 50 are first deformed by push of the main part 42 of the corresponding locking member 40 and then restored when the one of the protrusions 14 passes, thus, the one of the protrusions 14 is located between the blocking end 243 of the slideway 242, and the projecting part 46. In other words, the projecting parts 46 of the locking members 40 are urged to move away from the corresponding slideways 242 of the bracket 20 by push of the corresponding protrusions 14 of the data storage devices 10 and the resilient members 50 are deformed by push of the corresponding locking members 40, once the protrusions 14 of the data storage devices 10 bound the corresponding projecting parts 46, the resilient members 50 are restored to urge the projecting parts 46 to rebound and resist against the corresponding protrusions 14 of the data storage devices 10. The data storage devices 10 are secured to the bracket 20.

In disassembling the data storage devices 10, the operating portions 444 of the locking members 40 are pulled, thus retracting the projecting parts 46 of the locking members 40 releasing the ones of the protrusions 14 of the corresponding data storage devices 10. Thus, the data storage devices 10 are easily removed from the bracket 20.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A mounting apparatus for mounting a data storage device that has a protrusion protruding from a sidewall thereof, the mounting apparatus comprising:
   a bracket for holding the data storage device comprising a first side wall, the first side wall defining a slideway, for receiving the protrusion of the data storage device to slide therealong;
   a mounting member mounted to the first side wall;
   a locking member slidably mounted to the mounting member, the locking member comprising a projecting part adjacent the slideway of the bracket, for locating the protrusion of the data storage device; and
   a resilient member located between the mounting member and the locking member;
   wherein the projecting part of the locking member is urged to move away from the slideway of the bracket by push of the protrusion of the data storage device and the resilient member is deformed by push of the locking member, once the protrusion of the data storage device bounds the projecting part, the resilient member is restored to urge the projecting part to rebound and resist against the protrusion of the data storage device.

2. The mounting apparatus as claimed in claim 1, wherein the bracket comprises an inlet for the data storage device passing therethrough, the projecting part of the locking member comprises a guiding surface at a side thereof, and the side of the projecting part faces the inlet of the bracket.

3. The mounting apparatus as claimed in claim 2, wherein the slideway further comprises a blocking end opposite to the inlet of the bracket, the projecting part of the locking member is adjacent the blocking end, for locating the protrusion of the data storage device at the blocking end of the slideway.

4. The mounting apparatus as claimed in claim 2, wherein a flange is perpendicularly bent out from the first side wall at the inlet, a first cutout communicating with the slideway is defined in the flange.

5. The mounting apparatus as claimed in claim 4, wherein the locking member further comprises a main part, two guiding slots are defined in the main part, the mounting member comprises a body parallel to the first side wall of the bracket, two guiding tabs extend in from the body, for slidably engaging in the corresponding guiding slots.

6. The mounting apparatus as claimed in claim 5, wherein the mounting member further comprises an end board extending toward the first side wall of the bracket from an end of the body thereof, the end board defines a sliding slot therein, the locking member still further comprises an extension part perpendicularly extending from the main part thereof, for slidably engaging in the sliding slot of the mounting member.

7. The mounting apparatus as claimed in claim 6, wherein the projecting part protrudes from the main part opposite to the extension part, a limiting portion protrudes away from the first side wall of the bracket from the extension part of the locking member adjacent a distal end of the extension part, the limiting portion extends out of the mounting member.

8. The mounting apparatus as claimed in claim 7, wherein an operating portion extends toward the body of the mounting member from the distal end of the extension part.

9. The mounting apparatus as claimed in claim 6, wherein a shaft extends from the end board of the mounting member, the main part of the locking member defines a through-hole, the resilient member fits about the shaft, a distal end of the shaft is engaged in the through-hole.

10. The mounting apparatus as claimed in claim 6, wherein a plurality of catches is stamped out from the first side wall of the bracket, each of the catches defines a receiving space, a plurality of orientating members extend from the end board of the mounting member to engage in the receiving spaces of the corresponding catches.

11. The mounting apparatus as claimed in claim 5, wherein the mounting member further comprises a side board extending toward the first side wall of the bracket from a side of the body thereof, the end board defines a second cutout facing the slideway of the first side wall, for the protrusion of the data storage device passing therethrough.

12. The mounting apparatus as claimed in claim 11, wherein a plurality of catches is stamped out from the first side wall of the bracket, each of the catches defines a receiving space, a plurality of orientating members extend from the side board of the mounting member to engage in the receiving spaces of the corresponding catches.

13. An electronic device, comprising:
  a data storage device comprising a sidewall, a first protrusion and a second protrusion protruding from the sidewall;
  a bracket for holding the data storage device comprising a first side wall, the first side wall defining a slideway, for receiving the protrusions of the data storage device to slide therealong;
  a mounting member mounted to the first side wall;
  a locking member slidably mounted to the mounting member, the locking member comprising a projecting part adjacent the slideway of the bracket, for locating the first protrusion of the data storage device; and
  a resilient member located between the mounting member and the locking member.

14. The mounting apparatus as claimed in claim 13, wherein the bracket comprises an inlet for the fist and second protrusions of the data storage device passing therethrough, the projecting part of the locking member comprises a guiding surface at a side thereof, the side of the projecting part faces the inlet of the bracket.

15. The mounting apparatus as claimed in claim 14, wherein the slideway further comprises a blocking end opposite to the inlet of the bracket, the projecting part of the locking member is adjacent the blocking end, for locating the first protrusion of the data storage device at the blocking end of the slideway.

16. The mounting apparatus as claimed in claim 15, wherein the locking member further comprises a main part, two guiding slots are defined in the main part, the mounting member comprises a body parallel to the first side wall of the bracket, two guiding tabs extend in from the body, for slidably engaging in the corresponding guiding slots.

17. The mounting apparatus as claimed in claim 16, wherein the mounting member further comprises an end board extending toward the first side wall of the bracket from an end of the body thereof, the end board defines a sliding slot therein, the locking member still further comprises an extension part perpendicularly extending from the main part thereof, for slidably engaging in the sliding slot of the mounting member, the resilient member is located between the main part of the locking member and the end board of the mounting member.

18. The mounting apparatus as claimed in claim 17, wherein the projecting part protruding from the main part opposite to the extension part, a limiting portion protrudes toward the body of the mounting member from the extension part of the locking member adjacent a distal end of the extension part, the limiting portion extends out of the mounting member.

* * * * *